United States Patent [19]

Parr et al.

[11] 3,766,639

[45] Oct. 23, 1973

[54] METHOD FOR TESTING ELECTRONIC CIRCUITS USING VARIABLE LIQUID DIELECTRIC CONSTANT TESTING MEDIA

[75] Inventors: Frank R. Parr, Baltimore; Dale M. Weaver, Glen Burnie, both of Md.

[73] Assignee: The United States of America as represented by the Secretary of the Air Force, Washington, D.C.

[22] Filed: Jan. 20, 1972

[21] Appl. No.: 219,578

[52] U.S. Cl. ...................... 29/593, 29/588, 252/408, 264/272, 29/404

[51] Int. Cl. ........................ G01r 31/28, G01r 29/00

[58] Field of Search ...................... 29/574, 593, 404, 29/588; 252/408; 324/72, 73 PC; 264/272

[56] References Cited

UNITED STATES PATENTS

| | | | |
|---|---|---|---|
| 3,691,289 | 9/1972 | Rohloff | 29/588 |
| 3,566,458 | 3/1971 | O'Cone | 264/272 |
| 3,150,021 | 9/1964 | Sato | 29/574 |
| 2,857,626 | 10/1958 | Wagner et al. | 264/272 |
| 3,560,849 | 2/1971 | Ryan et al. | 324/73 R |

*Primary Examiner*—Charles W. Lanham
*Assistant Examiner*—D. C. Crane
*Attorney*—Harry A. Herbert et al.

[57] ABSTRACT

The combining of chlorothene with a dmethyl silicone fluid to provide a means and the method of testing frequency tuned electronic circuits, to be packaged in a solid resin, under simulated operating conditions.

3 Claims, No Drawings

METHOD FOR TESTING ELECTRONIC CIRCUITS USING VARIABLE LIQUID DIELECTRIC CONSTANT TESTING MEDIA

BACKGROUND OF THE INVENTION

This invention relates generally to a method and means for testing frequency tuned electronic circuits and more specifically to a liquid having a variable dielectric constant whereby electronic circuits may be tested under simulated actual conditions.

When certain electronic circuits are tested on the bench in the presence of air, and then are packaged in a solid embedding resin system, the difference in dielectric constant is great enough to cause a breakdown in the circuit that was not obvious on the bench. It was found that to test these circuits electrically prior to embedment in a media that could be removed easily, such as a liquid, yet had a dielectric constant at a given frequency equal to that of the final embedding resin would solve the problem. Furthermore, it is necessary that this testing media be removable without affecting the operation of the electronic circuit. A circuit which requires tuning to a particular frequency response range prior to potting is an example of the type of circuit being considered. It is not possible to mathematically calculate the correct tuning range during design for this type of circuit because of current leakage and noise. Therefore, it must be tuned either in air, in the embedding resin or in a liquid testing media. To tune this type of circuit in air with a dielectric constant of 1, and then embed it in, for example, an epoxy resin with a dielectric constant of 3.8 at 100 KHz, would result in improper functioning of the circuit and, thus, in most cases a non-repairable scrap unit. This improper functioning would be due to tuning the circuit in a media with one dielectric constant, and operating it in a media with a different dielectric constant. Therefore, the formulation of an easily removable testing media (such as a liquid) which can be varied in composition, is essential to proper functioning of this type of circuit. It is this liquid testing media along with the method of varying its composition that is being disclosed in this invention.

SUMMARY OF THE INVENTION

The invention utilizes a dimethlyl silicone fluid, as for example General Electric silicone fluid 910 manufactured by the General Electric Company, and combines this with chlorothene (1,1,1, trichloroethane) to provide a fluid of varying dielectric constant. The General Electric silicone fluid 910, when tested for dielectric constant at 25°C at 100KHz has a value of 2.7. Similarly, chlorothene when tested under the same conditions has a value of 6.7. When these two materials are mixed in various proportions the resultant dielectric constant values vary accordingly. Utilizing this media in testing electronic circuits, a determination is made of the dielectric constant of the embedding and/or the epoxy transfer molding resin. The testing media is then mixed to provide the proper dielectric constant. Subsequently, the circuit is tested in the media.

It is therefore an object of the invention to provide a new and improved liquid testing media.

It is another object of the invention to provide a new and improved liquid testing media having a variable dielectric constant.

It is a further object of the invention to provide a new and improved method of testing electronic circuits.

It is still another object of the invention to provide a new and improved liquid testing media that has a dielectric constant in the range of electronic circuit embedding resins.

It is still a further object of the invention to provide a new and improved method for testing frequency tuned electronic circuits.

These and other advantages, features and objects of the invention will become more apparent from the following description.

DESCRIPTION OF THE PREFERRED EMBODIMENT

Pursuant to these objects, the invention provides for a testing liquid and a method of using the liquid for testing electronic circuits.

A combination of a dimethyl silicone fluid having properties similar to those of General Electric silicone fluid 910 and chlorothene (1,1,1, thrichloroethane) in varying proportions, will have a dielectric constant from 2.7 to 6.7 at a test frequency of 100 KHz at 25°C. The general purpose polyester, epoxy, and silicone embedding resins along with epoxy transfer molding resin systems commerically available have dielectric constant values in this range. This testing media can be utilized in the proper mix ratio for frequency tuning circuits embedded in any of these resin systems.

The following table shows the dielectric constant for various ratios (parts by weight) of the two materials at 100 KHz and 25°C.

| GE 910 | Chlorothane | Dielectric Constant |
|---|---|---|
| 10 | 0 | 2.7 |
| 10 | 1 | 3.0 |
| 10 | 2 | 3.2 |
| 10 | 3 | 3.4 |
| 10 | 4 | 3.6 |
| 10 | 5 | 3.8 |
| 10 | 6 | 4.0 |
| 10 | 7 | 4.2 |
| 10 | 8 | 4.2 |
| 10 | 9 | 4.3 |
| 10 | 10 | 4.4 |
| 9 | 10 | 4.5 |
| 8 | 10 | 4.6 |
| 7 | 10 | 4.6 |
| 6 | 10 | 4.7 |
| 5 | 10 | 5.2 |
| 4 | 10 | 5.5 |
| 3 | 10 | 5.7 |
| 2 | 10 | 6.0 |
| 1 | 10 | 6.3 |
| 0 | 10 | 6.7 |

Once having established the dielectric constant of the liquid testing media electronic circuits may then be tested in a proscribed manner. Having determined the dielectric constant of the material where a circuit to be tested is to be embedded, selection of a combination of dielectric liquids having a resistance characteristics corresponding to this material is necessary. After forming the mixture, the integrated circuit assembly is immersed in the mixture and the circuit operated and the electrical parameters recorded while so immersed. At this time the circuit, if frequency responsive, may be tuned appropriately. The circuit is removed from the test media and immersed sucessively into each one of four baths of chlorothene heated to 50°C. Following removal from the fourth bath the circuit is drained and allowed to air dry. When the circuit is dry it may be encased in the potting compound where it will show the same electrical responsive characteristics as observed during the test.

Having thus disclosed our invention in a manner where it may be practiced by those in the field, we make the following claims.

1. A method for testing electronic circuits to be packaged in a solid resin comprising the steps of: selecting a combination of dielectric liquids having resistance characteristics corresponding to those of a conventional resin; immersing in the selected liquids an integrated circuit assembly and recording the electrical parameters observed upon operation of the circuitry while so immersed; draining off the immersion liquid and packaging the circuit in a resin.

2. A method of testing according to claim 1 including the additional steps of rinsing the circuit assembly in chlorothene heated to fifty degree centegrade and allowing the circuit assembly to air dry.

3. A method of testing according to claim 1, including the steps of frequency tuning the circuit assembly while immersed in the immersion liquid.

* * * * *